Patented Apr. 29, 1952

2,594,560

UNITED STATES PATENT OFFICE 2,594,560

LOW-TEMPERATURE POLYMERIZATION OF ETHYLENIC COMPOUNDS USING AS INITIATORS COMPOSITIONS COMPRISING SODIUM AZIDE AND AN OXIDANT

Edward G. Howard, Jr., Wilmington, Del., assignor to E. I. du Pont de Nemours and Company, Wilmington, Del., a corporation of Delaware No Drawing. Application April 27, 1950, Serial No. 158,610

10 Claims. (Cl. 260—80)

This invention relates to improvements in polymerization processes, and more particularly to new polymerization initiators.

The phenomenon of addition polymerization of ethenoid monomers, i. e., organic compounds containing a non-aromatic carbon-carbon double bond has long been known in the art. It likewise has been known that the polymerization of these compounds is initiated by many types of organic and inorganic materials. In recent years with the wide use of new synthetic resins and plastics, polymerization has become of major commercial importance. For some time there has been recognized the need for polymerization initiators capable of polymerizing unsaturated organic compounds to high molecular weight polymers in relatively short times, e. g., from one to twenty-four hours or less at relatively low temperatures, and preferably at room temperature. Such initiators have long been sought since they would permit major economies in operation costs, and at the same time, markedly increase the facility of handling various polymerization mixtures.

This invention has as an object a new and valuable improvement in the art of polymerizing unsaturated compounds, and particularly polymerizable ethylenically unsaturated compounds. A further object is a process for polymerizing these compounds to high polymers at low temperatures in relatively short times. Other objects will appear hereinafter.

These objects are accomplished by the present invention wherein an ethenoid monomer subject to addition polymerization, i. e., an organic compound having a non-aromatic carbon-carbon double bond and therewith subject to addition polymerization, is polymerized by bringing the same in contact, in aqueous dispersion, with azide ion and an agent oxidative of said azide ion to liberate nitrogen and of the group of the permanganate, hypochlorite, periodate, bromate and ceric ions, the latter two in acid solution. The azide, permanganate, hypochlorite, periodate, bromate, and ceric ions may be added as such to the aqueous medium or they may be formed in situ.

Not all agents which oxidize azide ion to free nitrogen are effective, with azide ions, as an initiator system for the polymerization of ethenoid monomers. Thus iodine, though oxidizing hydrazoic acid to nitrogen in the presence of certain catalysts such as thiosulfate (Yost and Russell, Systematic Inorganic Chemistry of the Fifth and Sixth Group Non-Metallic Elements, Prentice-Hall, New York, 1944, pages 129–130) does not, with azide ion, initiate polymerization as is demonstrated in Example A below. Similarly, nitrous acid, though oxidative of azide ion to nitrogen (Yost and Russell, page 129) is not, with azide ion, an initiator of polymerization as is demonstrated in Example B below.

The initiator compositions of this invention are further illustrated but not limited by the following examples in which the parts given are by weight. "Mole per cent" as used in these examples refers to the number of moles of the particular material involved per 100 moles of the total polymerizable monomers present.

Example I

A glass pressure bottle of internal capacity corresponding to 360 parts of water is charged at 0° C. with 50 parts of distilled water, 56 parts of absolute alcohol, 20 parts of vinyl chloride, 0.32 part (two mole per cent) of sodium azide and 1.4 parts (two mole per cent) of periodic acid dihydrate, $(HIO_4.2H_2O)$. Vinyl chloride is permitted to evaporate from the polymerization bottle until only 15.6 parts remain in the reactor. The bottle is then sealed with a crimped cap metal closure disk, lined with a gasket pressed from ethylene polymer and allowed to stand at room temperature for seven hours. It is then opened, and the contents removed, filtered, washed with distilled water, and vacuum dried. There is thus obtained 11.9 parts (75% conversion) of polyvinyl chloride as a white, free-flowing powder.

Example II

A polymerization bottle similar to that described in the previous example is charged with a mixture of 10.8 parts of allyl glycidyl ether, 25.4 parts of vinyl chloride, 80 parts of distilled water, 94.7 parts of ethanol, 0.65 part (two mole per cent) of sodium azide, and 2.32 parts (one mole per cent) of periodic acid dihydrate, flushed with oxygen-free nitrogen, sealed, and the polymerization carried out for seven hours at 30–32° C. The polymer is isolated as described previously. There is thus obtained 18.0 parts (49.7% conversion) of the 30/70 allyl glycidyl ether/vinyl chloride copolymer as a white, free-flowing powder. It should be noted that this polymerization appeared to be complete in about 2.5 hours.

In contrast to the high conversion obtained with the above initiator system of this invention, other initiators known and recognized in the art for polymerizing ethylenically unsaturated polymerizable compounds are by no means as effective when applied to the preparation of this 30/70 allyl glycidyl ether/vinyl chloride copolymer. Specifically, when these monomers are copolymerized in benzene solution in the presence of 1% benzoyl peroxide for twelve hours at 75° C., only a 20.8% conversion is obtained; when the polymerization is carried out in aqueous emulsion in the presence of 1% ammonium persulfate, 0.2% sodium bisulfite, 2% disodium monoacid phosphate hepta-hydrate [$Na_2HPO_4 \cdot 7H_2O$] activated by 0.2% silver nitrate for twelve hours at 40° C., only an 18.2% conversion to light gray colored polymer is obtained; and, finally, when the polymerization is carried out in methanol solution in the presence of 1% benzoyl peroxide and 0.5% benzil for 18 hours at 50° C., only a 9.8% conversion to polymer is obtained.

*Example III*

A polymerization bottle similar to that described in Example I is charged with 12.5 parts of methyl methacrylate, 40 parts of absolute ethyl alcohol, 50 parts of water, 0.16 part (two mole per cent) of sodium azide and 0.29 part (one mole per cent) of periodic acid dihydrate, flushed with oxygen-free nitrogen, and sealed. The polymerization is carried out for eight hours at 25° C. and the polymer isolated as described previously. There is obtained 9.5 parts (76% conversion) of polymethyl methacrylate as a powder. A solution of the polymer in ethylene dichloride at a concentration of 0.2 g./100 cc. of solution at 25° C. exhibits a relative viscosity of 1.275.

*Example IV*

In a similar manner to that described in Example I a polymerization bottle is charged with 13.2 parts of acrylonitrile, 220 parts of water, 0.16 part (one mole per cent) of sodium azide and 0.57 part (one mole per cent) of periodic acid dihydrate, flushed with oxygen-free nitrogen, then closed and the polymerization carried out for two hours at 25° C. The polymer is isolated, washed and dried as described previously. There is thus obtained 8.0 parts (61% conversion) of polyacrylonitrile as a white, free-flowing powder. A solution of the polymer in dimethylformamide at a concentration of 0.1 g./100 cc. of solution at 25° C. exhibits a relative viscosity of 1.074.

A similar experiment carried out with further samples of the same ingredients described above in the same proportions except that the polymerization is carried out for three hours at 0° C. also yields 8.0 (61% conversion) of polyacrylonitrile.

*Example V*

In a similar manner to that described in Example I a polymerization bottle is charged with a mixture of 13.2 parts of acrylonitrile, 220 parts of distilled water, 0.16 part (one mole per cent) of sodium azide, 0.25 part (0.5 mole per cent) of 1,3-dichloro-5,5-dimethylhydantoin and the polymerization carried out for two hours at 25° C. The polymer is isolated as described previously. There is thus obtained 4.1 parts (31% conversion) of polyacrylonitrile as a white, free-flowing powder. A solution of the polymer in dimethylformamide at a concentration of 0.1 g./100 cc. of solution at 25° C. exhibits a relative viscosity of 1.397.

*Example VI*

A polymerization reactor similar to that described in Example I is charged with 220 parts of distilled water, 13.2 parts of acrylonitrile, 0.16 part (one mole per cent) of sodium azide, 10 parts of 0.5 N solution of hydrochloric acid (corresponding to two mole per cent) and 0.42 part (one mole per cent) of potassium bromate. The reactor is flushed with nitrogen, sealed as previously described, and then heated at 40° C. for four hours with shaking. The polymer is isolated as described previously. There is thus obtained 9.1 parts (69% conversion) of polyacrylonitrile as a white, free-flowing powder.

In the case of bromate ion the aqueous dispersions should be acidic, i. e., at a pH less than 7.0. To demonstrate this, a polymerization bottle was charged with the same proportions of the above-mentioned ingredients omitting the hydrochloric acid solution. The bottle after being thoroughly flushed with oxygen-free nitrogen was sealed and allowed to stand at room temperature for 4 hours. At the end of this time, no polymerization was observed. The polymerization bottle was then opened, 0.25 part of concentrated hydrochloric acid solution added, and the polymerization bottle recapped. Within half an hour, obvious polymer formation was apparent, as evidenced by the precipitation of white, powdery polymer. After 19.5 hours more at room temperature, the polymerization bottle was opened and the polymer isolated as described previously. There is thus obtained 8.5 parts (64% conversion) of polyacrylonitrile as a white, free-flowing powder.

*Example VII*

Another polymerization reactor is charged in a similar fashion to that described in Example I with a mixture of 800 parts of distilled water, 52.8 parts of acrylonitrile, 0.64 part (one mole per cent) of sodium azide, 25 parts of a 0.5 N solution of hydrochloric acid (corresponding to 1.25 mole per cent) and 1.68 parts (one mole per cent) of potassium bromate. The reactor is flushed with oxygen-free nitrogen, capped and let stand at room temperature for 24 hours. The polymer is isolated as described previously. There is thus obtained 42.7 parts (80% conversion) of polyacrylonitrile as a white, free-flowing powder. A 13% solution of this polymer in dimethylformamide is clear and colorless and exhibits approximately the same viscosity as another sample of polyacrylonitrile whose molecular weight had been determined as 70,000. Another polymerization mixture identical with the preceeding one is observed to have an initial pH of 2.9 and after 6 hours, a pH of 3.1. Polymer formation in both these experiments is observed after about 30 minutes at room temperature.

*Example VIII*

A polymerization bottle similar to that described in Example I is charged with a mixture of 13.2 parts of acrylonitrile, 220 parts of distilled water, 0.16 part (one mole per cent) of sodium azide, and five parts of a 1 N solution of sodium hypochlorite (two mole per cent) and 15 parts of a 0.5 N solution of hydrochloric acid (three mole per cent), and the polymerization carried out for four hours at 25° C. The polymer is isolated as described previously. There is thus obtained 2.6 parts (20% conversion) of polyacrylonitrile as a white, free-flowing powder.

Example IX

A polymerization reactor similar to that described in Example I is charged with 220 parts of distilled water, 13.2 parts of acrylonitrile, 0.16 part (one mole per cent) of sodium azide, 0.5 part (0.28 mole per cent) of ceric ammonium sulfate [$Ce(SO_4)_2 \cdot 2(NH_4)_2SO_4 \cdot 4H_2O$] and ten parts of 0.5 N solution of hydrochloric acid (corresponding to two mole per cent). The reactor is flushed with nitrogen, sealed as previously described and then let stand at 25° C. for two hours. The polymer is isolated as described previously. There is thus obtained 9.0 parts (69% conversion) of polyacrylonitrile as a white, free-flowing powder.

Example X

A polymerization reactor similar to that described in Example I is charged with 220 parts of distilled water, 13.2 parts of acrylonitrile, 0.16 part (one mole per cent) of sodium azide, 0.42 part (one mole per cent) of potassium bromate and 12 parts of 0.25 M solution of hypophosphorous acid (corresponding to 1.2 mole per cent). The reactor is flushed with nitrogen, sealed as previously described and then let stand at 25° C. for thirty hours. The polymer is isolated as described previously. There is thus obtained 9.1 parts (69% conversion) of polyacrylonitrile as a white, free-flowing powder.

Example XI

A polymerization reactor similar to that described in Example I is cooled to 0–4° C. and charged with 220 parts of distilled water, 13.2 parts of acrylonitrile, 0.16 part (one mole per cent) of sodium azide, 10 parts of 0.5 N solution of hydrochloric acid (corresponding to two mole per cent) and 0.40 part (one mole per cent) of potassium permanganate. The reactor is flushed with nitrogen sealed as previously described and allowed to stand at 0 to 5° C. for three hours. The polymer is isolated as described previously. There is thus obtained 1.5 parts (11% conversion) of polyacrylonitrile. It should be pointed out that polymerization appeared complete in a very few minutes.

The same results were obtained when another experiment was carried out with additional samples of the same reactants in the same proportions except that only five parts of the hydrocholoric acid solution was used, and the potassium permanganate was dissolved in thirty parts of water and then added dropwise to the mixture of the other reactants over a period of one hour.

Example XII

A solution of 0.5 part of dodecyl mercaptan in 80 parts of chloroprene is emulsified in a homogenizing mixture with a solution containing 180 parts of water, 2.5 parts of sodium fatty alcohol sulfate, 0.4 part of the sodium salt of a naphthalenesulfonic acid/formaldehyde condensation product, 1.9 parts (0.83 mole per cent) of periodic acid dihydrate and 0.65 part (1.11 mole per cent) of sodium azide. The resulting emulsion is stirred in an atmosphere of nitrogen for 85 minutes, during which time the temperature rises from an initial value of 23° C. to a top of 34° C. and gradually falls to 32° C.—thus indicating an exothermic reaction. A solution of 0.4 part of phenothiazene and 0.4 part of p-tert-butylcatechol in 80 parts of benzene is emulsified with a solution of 1.2 parts of a synthetic detergent prepared in general in accordance with Example I of U. S. 2,163,133 and 0.6 part of the sodium salt of a naphthalenesulfonic acid/formaldehyde condensation product in 120 parts of distilled water. Ten (10) parts of the resulting emulsion is added to the above described polymerized emulsion to "short-stop" the polymerization. The resulting mixture of emulsions is then poured into an excess of methanol and the rubbery polymer thus formed removed by filtration. After being vacuum dried, there is obtained 13.5 parts of polychloroprene as a non-tacky, slightly elastic rubber.

Another polymerization is carried out as described above for five hours at 1.5–4.0° C. After isolating the product as described above, there is obtained 21 parts of polychloroprene as a non-tacky, slightly elastic rubber.

The following procedures demonstrate that not all agents which oxidize azide ion to nitrogen are effective with azide ion in initiating addition polymerization.

Example A

A polymerization reactor similar to that described in Example I is charged with 220 parts of distilled water, 13.2 parts of acrylonitrile, 0.16 part (one mole per cent) of sodium azide, five parts (one mole per cent) of 0.5 N hydrochloric acid solution, 0.90 part (one mole per cent) of $Na_2PO_4 \cdot 12H_2O$, 0.35 part (one mole per cent) of $NaH_2PO_4 \cdot H_2O$, 0.41 part (one mole per cent) of potassium iodide and 0.64 part (one mole per cent) of iodine. The reactor is flushed with nitrogen and 0.06 part (0.1 mole per cent) of sodium thiosulfate charged and the reactor sealed. After standing for as long as 24 hours at 25° C., no visible polymer has been formed in contrast to the 80% conversion obtained under like conditions as described previously in Example VI utilizing bromate ion in acid solution in place of the iodine.

Thus, although hydrazoic acid and iodine in the presence of a catalyst, such as sodium thiosulfate react to form a gaseous product (as reported by Yost and Russell, 129 and 130, ibid.), such a composition is not capable of initiating the polymerization of ethylenically unsaturated monomers since iodine is well recognized as an inhibitor. This is especially true for reactions involving a free radical mechanism, as has long been recognized to be the case in addition polymerization—see for instance, page 18 of the Chemistry of Free Radicals by Waters, Oxford 1946.

Similar results were obtained utilizing carbon disulfide as the catalyst for the hydrazoic acid/iodine reaction. Similar results were also obtained in like polymerization mixtures omitting the equimolar phosphate buffer and adding one mole per cent of periodic acid, as well as the iodine and potassium iodide, either with or without the thiosulfate catalyst. Similar experiments carried out with the same amounts of acrylonitrile, sodium azide and iodine omitting the equimolar phosphate buffer, the thiosulfate catalyst and the potassium iodide, but adding one mole per cent of periodic acid, led to the formation of a deep and characteristic iodine color. This color slowly faded and at the end of about one hour and a half at 25° C. had disappeared. Polymerization then occurred and proceeded quite rapidly leading to the formation of polyacrylonitrile at approximately 60% conversion during the next hour and a half. Thus the periodic acid first oxidized the iodine and then when the iodine had completely disappeared, the polymerization proceeded in the manner previously set forth for an azide ion/oxidizing agent composition of this invention.

*Example B*

A polymerization reactor is charged with a mixture of distilled water, acrylonitrile, sodium azide, hydrochloric acid and sodium nitrite and held under an atmosphere of nitrogen for 24 hours at 25° C. Although a vigorous reaction occurs when the reactants are mixed, as evidenced by an appreciable evolution of gas, no polyacrylonitrile was obtained at the end of the 24 hour period.

Thus, although the nitrous acid formed by the addition of sodium nitrite to the hydrochloric acid solution reacts with azide ion to liberate nitrogen (Yost and Russell, page 129 ibid.), such a composition is not capable of initiating the polymerization of ethylenically unsaturated monomers since nitric oxide [one of the decomposition products of this nitrous acid reaction (Yost and Russell, page 59–60 ibid.)] is well recognized as an inhibitor. This is especially true for reactions involving a free radical mechanism, as has long been recognized to be the case in addition polymerization—see, for instance, Klushesky and Wakefield, Ind. and Eng. Chem. 41, 1768–1771 (1949).

The azide, permanganate, bromate, hypochlorite, ceric and periodate ions may be added as such to the solution or they may be formed in situ. Thus, the source of the azide ions is quite immaterial to the invention providing that there be sufficient azide ions present. Hydrazoic acid itself may be used as well as any water-soluble azide salt. It is believed necessary for optimum operability that the azide ions be present at least to that concentration afforded by a water-soluble azide, soluble at least to the extent of 0.01 part per 100 parts of water at 25° C. For practical purposes, due to their readier availability and high water solubility, it is preferred to use one or more of the salts of hydrazoic acid with ammonio, an alkali metal, or an alkaline earth metal. Because of the greater availability and high water solubility of sodium azide, that particular source of azide ion is generally used in the practice of this invention.

Specific examples of the broad class of sources of azide ions which may be used in conjunction with one of the previously described oxidizing agents in forming the initiator compositions of this invention are: the azides of the elements of group I-A of the periodic table, e. g., lithium, sodium, potassium, rubidium, cesium azides; the azides of the elements of group II-A of the periodic table, e. g., beryllium, magnesium, calcium, strontium, barium; the water-soluble azides of elements of group II-B of the periodic table, e. g., zinc and cadmium azides; the water-soluble azides of the elements of group III-A of the periodic table including the rare earth or lanthanide series elements, e. g., yttrium, lanthanum, cerium azides; the water-soluble azides of the elements of group VI-A of the periodic table, e. g., chromium azide; the water-soluble azides of the elements of group VII-A of the periodic table, e. g., manganese azide; the water-soluble azides of group VIII of the periodic table particularly the elements of the first triad, i. e., iron, cobalt and nickel azides. Other sources of the azide ion may, of course, also be used such as, for instance, the water soluble organo-inorganic complex azide salts, e. g., the pyridine complex of zinc azide; the water soluble complex inorganic salts such as $NaSbBr_9N_3$, $Na_8[AsBr_3N_3]_8$; water soluble non-metallic azides, e. g., chlorine azide, bromine azide, dicyandiazide; water soluble salts of non-metallic azide acids, e. g., ammonium, sodium, potassium, barium azido-sulfonates; quaternary ammonium hydrazide salts, e. g., tetramethylammonium hydrazide; amine hydrazide salts, e. g., hydrazine hydrazide and hydroxyl amine hydrazide. As previously pointed out, the azide salts of ammonia and the elements of groups I-A and II-A of the periodic table, e. g., the alkali metal and alkaline earth metal azides are preferred because of their greater water solubility and readier availability.

The sources of ceric ion in aqueous solution are ceric oxide, ceric hydroxide; and the ceric salts with mono- or polybasic acids, particularly those with the oxygen containing mineral acids, e.g., sulfuric, nitric, phosphoric and the like. Particular examples of these ceric salts are: ceric sulfate, basic ceric nitrate, ceric ammonium nitrate, ceric phosphate. Many of these ceric salts ordinarily exist as hydrates of various degrees of hydration.

The sources of the bromate and permanganate ions in aqueous solution include the respective acids themselves (although it should be pointed out that both these acids are unstable in concentrated solutions) and their water soluble salts, such as those with ammonia and the alkali metal and alkaline earth metals, e. g., ammonia, potassium, sodium, lithium, rubidium, cesium, calcium, barium, strontium bromates and permanganates.

The sources of hypochlorous acid in aqueous solution include, in addition to the acid itself, the hypochlorites of ammonia and the alkali metals and alkaline earth metals, such as ammonium, potassium, lithium, sodium, cesium, rubidium, calcium, barium, strontium and magnesium. Also included are compounds containing monovalent positive chlorine (i. e., the so-called active chlorine) such as the well-known N-chloroamides, for example, Chloramine-T, Chloramine-B, including the cyclic N-chloroamides, such as 1,3-dichloro-5,5-dimethylhydantoin and the like.

The sources of periodate ion include the acid itself and salts thereof with ammonia and the alkali metals, such as sodium, potassium, rubidium, cesium. The periodates and periodic acid itself exist in various hydrated forms as well as in various ion valence stages. See Caven and Lander, Systematic Inorganic Chemistry (Blackie, Glasgow, 1936) p. 443. For instance, the most common form of the acid is the dihydrate—although the anhydrous acid as well as the more complex $H_4I_2O_9$ are known. The periodate salts are usually found in compositions corresponding to the following general type molecular formulas: $M_4IO_6$, $M_3IO_5$, $M_4I_2O_9$, as well as the expected $MIO_4$, where M is an alkali metal or ammonium ion. Furthermore, many salts of the complex periodic acids exist in which only part of the hydrogen is replaced by metal, e. g., $Na_2H_3IO_6$ and $Na_3H_2IO_6$.

In contrast to the previously described high conversions to polymers obtained with the initiator systems of this invention at low temperatures and in short times, other initiators known and recognized in the art for initiating the polymerization of ethylenically unsaturated, polymerizable compounds are by no means as effective, for instance, with acrylonitrile. Specifically, when a 9% dispersion of acrylonitrile in water is held at 25° C. for four hours in the presence of 1.0% by weight of ammonium persulfate, only traces of polymer can be isolated from the reaction mixture; when another sample of the same monomer/water mixture is held at 25° C. with 1% benzoyl peroxide for 4–16 hours no traces of polymer can be isolated; when a 7:1 mixture of acrylonitrile in water is heated at temperatures as high as 100° C. for as long as 18 hours, only a 40% yield of polyacrylonitrile is obtained. These results clearly illustrate that the initiators known in the art are capable of effective polymerization of acrylonitrile in high yields, and in some instances in any amount at all, only at relatively high temperatures and for long periods of time. However, as is illustrated in Example IV for instance, the azide ion/oxidizing agent initiator systems of this invention are capable of polymerizing the same monomer in conversions as high as 61%, at temperatures as low as 25° C. in as short a time as two hours, or at even lower temperatures (0° C.) in only three hours.

While acidic dispersions are preferred for all the initiator systems of this invention, acidic conditions are necessary in the case of bromate and ceric ions.

The effect of the initiator combination used in the practice of this invention is quite surprising since the elements taken singly, i. e., either the selected azide or the oxidizing agent, are barely classifiable as polymerization initiators at all—at best serving to produce relatively low molecular weight polymer in very low conversions, e. g., at 5% or less. This is illustrated by the fact that little or no polymerization of acrylonitrile is noted even after as long as 24 hours at 25° C. in the presence of one mole per cent of periodic acid dihydrate alone or potassium bromate alone, with or without the further addition of one mole per cent of hydrochloric acid solution as activator, in either distilled water or absolute alcohol media. Furthermore, similar attempted polymerizations of acrylonitrile in the presence of two mole per cent of sodium azide alone, with or without the further addition of two mole per cent of hydrochloric acid solution as activator, at temperatures as high as 32° C. for as long as 24 hours or 60° C. for four hours lead to the production of no appreciable quantity of polyacrylonitrile. The maximum conversion to polymer obtained with any of these systems is 5%, obtained in the case of periodic acid dihydrate alone in absolute ethanol.

The process of this invention is of generic applications to the addition polymerization of polymerizable compounds having the non-aromatic >C=C< group, i. e., to monomeric, ethylenically unsaturated, polymerizable compounds.

Thus, the process of this invention is applicable, for instance, to monomeric, unsaturated, polymerizable compounds in which the unsaturation is due to a single, terminal, ethylenic group which is attached to a negative radical. More specifically it is applicable to polymerizable vinylidene compounds, including vinyl compounds, and to polymerizable acrylyl and alkacrylyl compounds. The process is applicable to polymerizable compounds having a plurality of ethylenic linkages of aliphatic character whether conjugated or isolated. A particularly preferred class of compounds to which the process of this invention is applicable is that of polymerizable, unsaturated compounds wherein the non-aromatic carbon to carbon unsaturation comprises a terminal methylene joined by an ethylenic double bond to its neighboring carbon, i. e., consists of a $CH_2=C<$ group.

Compounds having such a terminal group i. e., $CH_2=C<$, which are subject to polymerization and copolymerization by the process of this invention, include those having one ethylenic unsaturation such as olefins, e. g., ethylene, propylene, isobutylene; acrylyl and alkacrylyl compounds, e. g., acrylic, haloacrylic and methacrylic acids, esters, nitriles, and amides for example, acrylonitrile, methyl methacrylate, ethyl methacrylate, butyl methacrylate, octyl methacrylate, cyclohexyl methacrylate, methoxymethyl methacrylate, n-butoxymethyl methacrylate, n-butoxyethoxyethyl methacrylate, chloroethyl methacrylate, methacrylic acid, ethyl acrylate, alpha-chloroacrylic acid, and aminoalkylmethacrylates, such as beta-diethylaminoethyl methacrylate; vinyl and vinylidene halides, e. g., vinyl chloride, vinylidene chloride; fluorinated ethylenes, e. g., vinyl fluoride, vinylidene fluoride, 1-fluoro-1-chloroethylene; vinyl carboxylates, e. g., vinyl acetate, vinyl trimethyl acetate, vinyl formate, vinyl hexanoate, vinyl laurate, vinyl chloroacetate, vinyl propionate, vinyl stearate; N-vinyl imides, e. g., N-vinylphthalimide, N-vinylsuccinimide; N-vinyl lactams, e. g., N-vinylcaprolactam, N-vinylbutyrolactam; vinyl aryls, e. g., styrene and vinylnaphthalene and other vinyl derivatives such as methyl vinyl ketones, vinylpyridines, vinyl isobutyl ethers, vinyl ethyl ethers. Other monomers polymerizable by the process of this invention include the polyfluoroethylenes of the general formula $CF_2=CXY$, wherein X is H, Cl or F and Y is Cl or F, such as tetrafluoroethylene, chlorotrifluoroethylene, trifluoroethylene, 1,1-dichloro-2,2-difluoroethylene, either alone, or copolymerized with ethylene or other comonomers.

Specific examples of copolymers obtained in the process of this invention employed with mixtures of polymerizable, ethylenically, unsaturated compounds include ethylene/vinyl chloride, ethylene/tetrafluoroethylene, acrylonitrile/isobutylene, acrylonitrile/vinyl pyridines, particularly those containing 2 to 10% of the vinyl pyridines, isobutylene/vinylidene chloride, ethylene/vinyl acetate, isobutylene/vinyl acetate, vinyl acetate/allylidene diacetate, vinyl acetate/vinyl methyl ether; copolymers of monovinyl acetylene with styrene, methyl methacrylate and acrylonitrile; and copolymers of methyl methacrylate containing up to 10% of styrene, vinyl acetate, butyl methacrylate, acrylic esters, methacrylic acid, methacrylic anhydride or ethylene glycol dimethacrylate.

Polymerizable compounds that have a plurality of ethylenic double bonds that may be polymerized or copolymerized by the process of this invention include those having conjugated ethylenic double bonds which are furthermore both terminal ethylenic double bonds such as butadiene, 2-chlorobutadiene, 2-fluorobutadiene and 2-phenoxybutadiene and also compounds containing two or more ethylenic double bonds which are isolated with respect to each other. Compounds of this latter type include those having two or more ethylenic double bonds conjugated with a carboxylic group, e. g., methacrylic anhydride, acrylic and substituted acrylic esters of polyhydric alcohols, such as, ethylene glycol dimethacrylate, diethylene glycol dimethacrylate, triethylene glycol dimethacrylate, tetraethylene glycol dimethacrylate, diethylene glycol diacrylate, decamethylene glycol diacrylate, and glyceryl triacrylate and mixtures of such esters, e. g., dimethacrylate esters of a mixture of polyethylene glycols. Compounds having one ethylene group conjugated with a carboxylic group that may be employed include diallyl maleate, vinyl methacrylate, allyl methacrylate, crotyl methacrylate, methallyl methacrylate, and compounds which have no conjugation of the polymerizable ethylenic groups with carboxylic groups including diallyl phthalate, diallyl carbonate, diallyl adipate, diallyl formate, divinyl succinate, divinyl adipate, divinyl benzene.

Polymerizable compounds that have a plurality of unsaturated linkages, preferably aliphatic, either conjugated or not, may in general be polymerized by using the process of this invention. Particularly outstanding among such compounds are the -ene/-yne type monomers of which monovinylacetylene and divinylacetylene are specific examples of the conjugated type.

While for the most part, compounds which have a terminal methylene group joined by an ethylenic double bond to its neighboring carbon, i. e., compounds which have a terminal ethylene group carrying solely hydrogen on its terminal carbon, i. e., compounds containing the terminal group $CH_2=C<$, are preferred as the polymerizable and copolymerizable monomers for whose polymerization the initiators of this invention are useful, other compounds which are polymerizable through use of the initiator compositions of this invention include the esters of fumaric and maleic acids, e. g., diethyl and dimethyl fumarate and maleate, which may be copolymerized, for instance, with ethylene, vinyl chloride or styrene by the process of this invention. Other copolymers thus obtainable include copolymers of ethylene, propylene, isobutylene, 2-ethylhexene-1 and mixed isobutylene/vinylisobutyl ether copolymers with maleic anhydride, copolymers of isobutylene with vinyl acetate and dimethyl fumarate or maleate; copolymers of allyl chloride with maleic anhydride; copolymers of styrene with maleic anhydride; and the condensation products of maleic anhydride with ethylene glycol or propylene oxide. Carbon monoxide, sulfur dioxide, and acetylene are likewise copolymerizable with ethylene by the process of this invention.

In addition to homopolymers and copolymers as described above that may be obtained by the process of this invention, modified polymeric products may be obtained by carrying out the polymerization in the presence of materials which are nonpolymerizable under the conditions employed but which combine with a plurality of units of the monomer. The products obtained by such a polymerization or chain transfer reaction may be represented by the formula $Y(A)_nZ$, wherein A is a divalent radical formed from a polymerizable monomer such as ethylene, $n$ is an integer of 2 to 50 or even higher and Y and Z are fragments terminally attached to the chain of monomer units —$(A)_n$—, which fragments form together a molecule of the nonpolymerizable compound involved. Typical examples of such nonpolymerizable telomerization agents, i. e., telogens, are halogenated compounds, e. g., carbon tetrachloride; carboxylic acids, e. g., isobutyric acid; carboxylic anhydrides, e. g., isobutyric anhydride; carboxylic acid esters, e. g., ethyl propionate; acetals, e. g., dioxolanes, mercaptans, bisulfites, alcohols, ethers, silicon halides, hydrogen chloride and similar compounds. Products of this type are described more fully and their preparative methods given in greater detail in U. S. Patents 2,390,099, 2,395,292, 2,389,426, 2,402,137, and 2,407,181. In a similar manner hydrogen may be employed in the polymerization of ethylene using the initiators of this invention to give a modified ethylene polymer.

This invention is applicable to the polymerization of any ethylenically unsaturated compound subject to addition polymerization by prior techniques. The optimum conditions as in the case of prior polymerization initiators will, of course, vary from monomer to monomer as well as with the various initiator systems of this invention employed. Thus, in the polymerization of such gases as ethylene and propylene, it is normally preferred to carry out the polymerization under superatmospheric pressure, usually of the gaseous monomer being polymerized; whereas, for instance, in the polymerization of styrene, it is normally not preferred to carry out the polymerization under other than atmospheric pressure. Similarly, certain of the initiator compositions of this invention are more effective at lower temperatures than others.

The polymerizations are usually carried out in acidic systems at temperatures in the range of 0° to 50° C. Higher temperatures such as up to 200° C. may be found useful, particularly when the time of polymerization is to be kept to a minimum, e. g., in a continuous polymerization process. Lower temperatures such as down to −30° C. may similarly be found useful, particularly when the polymerization is to be carried out slowly with a view towards preparing the highest molecular weight polymer. However, as has been pointed out previously in this specification, one of the outstanding attributes of the initiator compositions of this invention is their ability to cause the polymerization to high molecular weight, useful products of ethylenically unsaturated, polymerizable monomers in high conversions at relatively low temperatures and in short times. As has been pointed out previously, these low operating temperatures, i. e., from 0° to 50° C. and especially from 25 to 40° C. are to be desired because of the simplicity and inexpensiveness of the polymerization equipment necessary, while still producing polymers of desirable high molecular weight quality in high degrees of conversion.

The polymerizations usually are carried out for periods of time ranging from one to twenty-four hours, although shorter and longer periods may be used, especially in th higher and lower ranges, respectively, of the operating temperatures. It should be pointed out that the initiator compositions of this invention are particularly outstanding for their ability to produce high molecular weight, useful polymers at relatively low temperatures in relatively short times. Effectively, there is no upper limit to the time of polymerization since this can be carried out for as long as is desired. The minimum time of polymerization is, of course, a function of the polymerization temperature and the degree of conversion to polymer desired and may vary from a few seconds at temperatures from 100 to 200° C., such as would be used in a continuous polymerization process, to one to two hours at temperatures in the range of 0° to 20° C., both times being for relatively low conversions.

The term "polymerization" as used in this specification includes within its scope the polymerization of one monomer alone and the copolymerization of two or more monomers, as well as the telomerization, i. e., polymerization in the presence of a chain transfer agent or telogen, of polymerizable, ethylenically unsaturated monomers.

The amount of the initiator compositions of this invention employed in the various polymerizations is subject to a wide variation. In general, from 0.05 to 25% by weight of the total catalyst composition based on the monomers being polymerized may be used. These above figures relative to the various proportions of the initiator compositions of this invention that may be used in the polymerization of ethylenically, unsaturated, polymerizable, monomers have been given in the older more frequently used weight per cent figures based on the monomers charged. However, since polymerization functions solely as a molecular process and since obviously the molecular weights of the vast number of polymerizable monomers operable with the initiator compositions of this invention varies over such a wide degree, for a clearer understanding of the relative amounts of the catalyst compositions that may be used, it is more helpful to phrase these figures on a mole per cent basis based on the monomers charged. Thus, for the preparation of polymers of the best combination of properties, e. g., molecular weight, solubility, purity, etc., it is preferred to use from 0.01 to 20.0 mole per cent, or higher, even up to 100 mole per cent, of the initiator compositions of this invention based on the total moles of polymerizable monomers charged. Of course, for highest molecular weight, it is, as is always the case, preferred to initiate as few growing polymer chains as possible. However, as is true in all addition polymerizations, a decrease in the number of growing polymer chains, while in theory resulting in higher molecular weight, more desirable polymers, at the same time markedly decreases the polymerization rate. Thus, for practical purposes, although any small quantities even down to 0.01 mole per cent of the initiator compositions of this invention may be used, it is preferred to use 0.5 to 5.0 mole per cent based on the total initiator composition.

It is not necessary that the azide ion/oxidizing agent initiator compositions of this invention contain the two types of components in any given molecular proportions. For instance, the azide ion portion of these compositions on a molecular basis may be as high as five to one times that of the oxidizing agent or higher. In fact, initiator compositions wherein the azide ion portion is 100 times that of the oxidizing agent portion are within the scope of this invention. It is also true that the oxidizing agent portion of the initiator compositions may be as high as ten to one times that of the azide ion portion as calculated on a molecular basis. However, it should be pointed out that such compositions do not serve as outstandingly effective initiators. In fact, when the oxidizing agent portion of the composition reaches appreciable proportions, for instance, greater than ten times the azide ion portion, the initiating action is markedly decreased. For the best overall results, it is preferred that the initiator compositions of this invention contain an excess of the azide ion portion over the oxidizing agent, preferably in a 1:1 to 3:1 ratio on a molecular basis. It is not necessary that such conditions obtain, however, for as pointed out in the specification, outstanding initiator action is evidenced by compositions containing a source of the azide ion and one of the particular oxidizing agents in quantities ranging from 1:1 to 5:1 ratios on a molecular basis.

As previously indicated, the initiator compositions of this invention can be employed with any monomer which is polymerizable with conventional initiators.

The new initiator compositions of this invention have several unusual and outstanding advantages over conventional initiators employed for the addition polymerization of ethylenically unsaturated compounds. Specifically, these new initiator compositions give high conversions to high molecular weight, useful polymers at low temperatures and are particularly effective in the room temperature range. They involve no peroxidic compounds either in themselves, in the initiation reaction, or in the final polymer product and, hence, not only produce more stable polymeric products, but are appreciably more stable than other conventional initiators. In view of this greater stability, they obviously are more readily handled and more easily stored both at higher temperatures and for longer times than can safely be done with the other known initiator systems. Furthermore, the initiator compositions of this invention are particularly novel and outstanding since they do not possess any active hydrogens directly bonded to carbon. Such active hydrogens in initiator systems are particularly detrimental to the preparation of high molecular weight polymers since they serve as chain transfer agents, thus, stopping the propagation of a growing chain and, therefore, leading to the preparation of low molecular weight polymers. Other initiator systems given in the art are particularly deficient in this respect which is of most importance of the case of the polymerization of such monomers as tetrafluoroethylene, etc.

The foregoing detailed description has been given for clearness of understanding only and no unnecessary limitations are to be understood therefrom. The invention is not limited to the exact details shown and described for obvious modifications will occur to those skilled in the art.

What I claim is:

1. In the addition polymerization of ethylenically unsaturated monomers subject to addition polymerization, the improvement wherein said monomer is polymerized in aqueous dispersion by contact wtih an initiator system comprising azide ion and an oxidant thereof of the class consisting of periodate, hypochlorite, permanganate, bromate, and ceric ion, the latter two in acidic dispersion.

2. In the addition polymerization of ethylenically unsaturated monomers subject to addition polymerization, the improvement wherein said monomer is polymerized in aqueous acidic dispersion by contact with an initiator system comprising azide ion and an oxidant thereof of the class consisting of periodate, hypochlorite, permanganate, bromate, and ceric ion.

3. In the addition polymerization of ethylenically unsaturated monomers subject to addition polymerization, the improvement wherein said monomer is polymerized in aqueous dispersion by contact with an initiator system comprising azide and periodate ions.

4. In the addition polymerization of ethylenically unsaturated monomers subject to addition polymerization, the improvement wherein said monomer is polymerized in aqueous acidic dispersion by contact with an initiator system comprising azide and periodate ions.

5. In the addition polymerization of ethylenically unsaturated monomers subject to addition polymerization, the improvement wherein said monomer is polymerized in aqueous dispersion by contact with an initiator system comprising azide and permanganate ions.

6. In the addition polymerization of ethylenically unsaturated monomers subject to addition polymerization, the improvement wherein said monomer is polymerized in aqueous acidic dispersion by contact with an initiator system comprising azide and permanganate ions.

7. In the addition polymerization of ethylenically unsaturated monomers subject to addition polymerization, the improvement wherein said monomer is polymerized in aqueous dispersion by contact with an initiator system comprising azide and hypochlorite ions.

8. In the addition polymerization of ethylenically unsaturated monomers subject to addition polymerization, the improvement wherein said monomer is polymerized in aqueous acidic dispersion by contact with an initiator system comprising azide and hypochlorite ions.

9. In the addition polymerization of ethylenically unsaturated monomers subject to addition polymerization, the improvement wherein said monomer is polymerized in aqueous acidic dispersion by contact with an initiator system comprising azide and bromate ions.

10. In the addition polymerization of ethylenically unsaturated monomers subject to addition polymerization, the improvement wherein said monomer is polymerized in aqueous acidic dispersion by contact with an initiator system comprising azide and ceric ions.

EDWARD G. HOWARD, Jr.

REFERENCES CITED

The following references are of record in the file of this patent:

UNITED STATES PATENTS

| Number | Name | Date |
|---|---|---|
| 2,460,606 | Stewart | Feb. 1, 1949 |